United States Patent
Kumamoto et al.

(10) Patent No.: US 8,384,963 B2
(45) Date of Patent: Feb. 26, 2013

(54) SYSTEM AND METHOD FOR MONITORING OUTPUT OF PRINTING DEVICES

(75) Inventors: Danny Naoshi Kumamoto, Garden Grove, CA (US); Naoki Komine, Hawthorne, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 663 days.

(21) Appl. No.: 12/568,902

(22) Filed: Sep. 29, 2009

(65) Prior Publication Data

US 2011/0075193 A1    Mar. 31, 2011

(51) Int. Cl.
*H04N 1/409* (2006.01)
*G06K 15/00* (2006.01)
*G03G 15/00* (2006.01)

(52) U.S. Cl. ............... 358/3.26; 358/1.14; 358/1.18; 399/15; 399/395

(58) Field of Classification Search ............ 358/1.14, 358/1.18, 3.26; 399/15, 395
See application file for complete search history.

(56) References Cited

U.S. PATENT DOCUMENTS

| | | | |
|---|---|---|---|
| 2006/0119877 A1* | 6/2006 | Leute et al. | 358/1.14 |
| 2008/0037034 A1 | 2/2008 | Ishii | |
| 2009/0244143 A1* | 10/2009 | Huang | 347/14 |
| 2009/0274342 A1* | 11/2009 | Wu et al. | 382/112 |
| 2010/0061746 A1* | 3/2010 | Matsuoka | 399/45 |
| 2010/0135680 A1* | 6/2010 | Adachi et al. | 399/16 |

* cited by examiner

*Primary Examiner* — Twyler Haskins
*Assistant Examiner* — Fred Guillermety
(74) *Attorney, Agent, or Firm* — Chen Yoshimura LLP

(57) ABSTRACT

A printing device is provided with an imager to capture an output image of the paper after it is printed on. The output image is compared to an input image representing the image being printed to detect any artifacts in the output image and to determine the type of the artifacts. The types of the artifacts include effects caused by dirty drum, low or missing toner, dirty or wrinkled paper, etc. The printing device performs a responsive action based on the type of artifacts detected, including displaying a diagnostic message, stopping the printing, rejecting the sheet, re-printing, printing subsequent pages with a corrective action, etc. Further, another imager is provided to capture an image of the paper before it is printed on, and the image is analyzed to detect artifacts of the input paper, including dirty or wrinkled paper, wrong paper size, paper skew or misalignment, etc.

21 Claims, 3 Drawing Sheets

SYSTEM AND METHOD FOR MONITORING OUTPUT OF PRINTING DEVICES

BACKGROUND OF THE INVENTION

1. Field of the Invention

This invention relates to a system and method for monitoring output of printers and copiers, and in particular, it relates to such a system and method that can stop printing or copying when the quality of the output is not acceptable.

2. Description of Related Art

A conventional printer or copier will continue to make printed sheets until the printer or copier runs out of resources such as when the paper runs out or the toner goes too low or when the printer or copier encounters other errors such as hardware problem or paper jam. Sometimes the printer or copier may have other problems that cause low quality printouts but will not stop the printer or copier from continuing to print. For example, the toner may be low enough to give bad output (too light, blank areas, etc), or the print drum may have some foreign object to create smudges or spots or other visible problems on the printed sheets. Thus, unless an operator is physically at the printer or copier to check on the output, the printer or copier will continue to operate, resulting in many sheets of unacceptable output that have to be discarded. Sometimes, particularly in a professional print shop environment, it could happen that thousands of sheets of bad output are produced before the problem is noticed and printing is stopped. This wastes natural resources, money and time.

U.S. Pat. Appl. Pub. No. 2008/0037034 describes an image forming apparatus which "includes a unique information acquisition unit to acquire unique information unique to document data to be a print object from the document data; a storage unit to store the acquired unique information in association with the document data, and to store the unique information as reference unique information; an image forming unit to print an image based on the stored document data and the unique information associated with the document data on a same recording medium; a reading unit to read the printed unique information as unique information to be compared; and a control unit to compare the unique information to be compared with the stored reference unique information to stop printing of the document data when the control unit judges that the unique information to be compared and the stored reference unique information do not accord with each other." (US 2008/0037034, Abstract.) In the preferred embodiment, the "unique information" is a hash value.

SUMMARY

Accordingly, the present invention is directed to a printing system and related method that substantially obviates one or more of the problems due to limitations and disadvantages of the related art.

An object of the present invention is to provide for automated checking of printer or copier outputs for visible errors and automatically stopping the printing when such errors are detected.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a printing device including: an image forming section for printing on a recording medium based on an input image; a transport mechanism for transporting the recording medium along a transport path from an input port to an output port past the image forming section; an output imager disposed on the transport path downstream from the image forming section for capturing an output image of the recording medium after it is printed on; and a control section coupled to the image forming section, the transport mechanism and the output imager, wherein the control section receives the output image from the output imager, compares the output image with the input image to detect any artifacts in the output image and to determine types of the detected artifacts, and performs responsive actions based on the types of the detected artifacts.

The types of artifacts may include: extraneous dark spots or white spots caused by dirty or defective drum, low image intensity caused by low toner, low intensity of one color caused by low color toner, extraneous features caused by dirty recording medium or wrinkled recording medium, image skew, skew of the recording medium, and misalignment of the recording medium.

The responsive action may include: displaying a diagnostic message, controlling the transport mechanism to stopping printing, controlling the transport mechanism to route the printed recording medium to an alternative output port, controlling the transport mechanism to route the recording medium for re-printing, and printing subsequent pages with a corrective action.

In another aspect, the present invention provides a printing device which includes: an image forming section for printing on a recording medium; a transport mechanism for transporting the recording medium along a transport path from an input port to an output port past the image forming section; an input imager disposed in the transport path upstream from the image forming section for capturing a blank image of the recording medium before it is printed on; and a control section coupled to the image forming section, the transport mechanism and the input imager, wherein the control section receives the blank image from the input imager, analyzes the blank image to detect any artifacts of the recording medium and to determine types of the detected artifacts, and performs responsive actions based on the types of the detected artifacts of the recording medium.

In another aspect, the present invention provides a printing method implemented in a printing device having an image forming section, a transport mechanism and an output imager, the method including: storing an input image to be printed; printing the input image on a recording medium using the image forming section; capturing an output image of the recording medium after it is printed on using the output imager; comparing the output image with the input image to detect any artifacts in the output image and to determine types of the detected artifacts; and if an artifact is detected, performing responsive actions based on the types of the detected artifacts.

In another aspect, the present invention provides a printing method implemented in a printing device, the printing device comprising an image forming section, a transport mechanism and an input imager, the method including: printing an image on a recording medium using the image forming section; capturing a blank image of the recording medium before it is printed on using the input imager; analyzing the blank image to detect any artifacts of the recording medium and to determine types of the detected artifacts; and if an artifact of the recording medium is detected, performing responsive actions based on the types of the detected artifacts of the recording medium.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
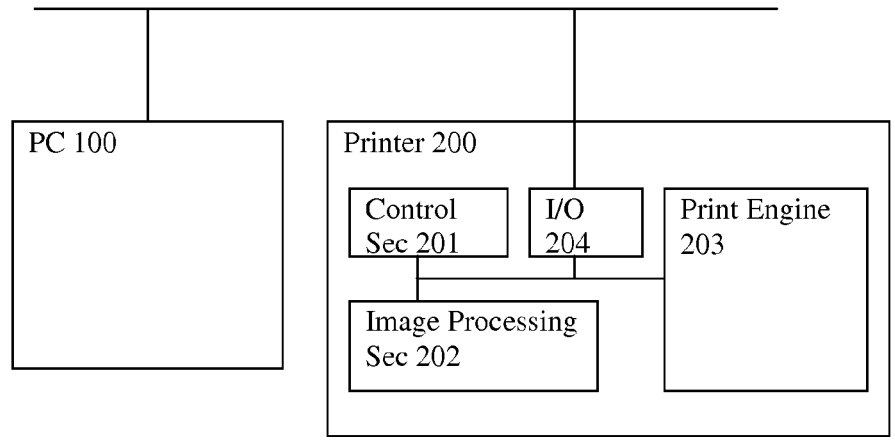
FIG. 1 is a block diagram illustrating a printer in which embodiments of the present invention are implemented.

The output monitoring system and method described in this disclosure apply to both printers and copiers, as well as machines that perform both printing, copying and scanning functions (sometimes referred to as all-in-one machines). For convenience, the term "printing device" is used to refer to all such devices, and the term "printing" should be understood to include copying as well. Typically, a printer receives an electronic document as input and generates printed sheets (hardcopies) as output, which a copier receives an original hardcopy and makes copies (hardcopies) of the original. Many modern copiers have a scanning section that scans the original hardcopy to generate an electronic image, and a printing section that prints the copy from the electronic image.

Embodiments of the present invention provide a system and related method which automatically checks the output sheets of the printing device for visible artifacts or errors, and automatically stops printing or performs other actions (as described in more detail later) when such artifacts are detected. According to an embodiment of the present invention, an imager (referred to as the output imager) is disposed after the image forming section of the printing device to capture images of the printed sheets. The output imager can be any suitable imaging device, such as a line scanner, a camera, etc. The captured images (referred to herein as the output images) are compared against original images of the documents being printed (referred to herein as input images) to determine whether the output images are of acceptable quality. In the case of a copy operation, the original images may be scanned images of the hardcopy original generated by the scanning section of the printing device. In the case of a printing operation, the original images may be bitmap images generated during the rendering process. If the output image is deemed unacceptable, the printing device performs a responsive action as will be described in more detail later.

The image comparison may be a pixel-by-pixel comparison. Many algorithms exist for quick and efficient comparison of two dimensional (2D) bitmap images. Any suitable image comparison algorithms may be used to implement this invention. Alternatively, the images may be compared initially by computing a hash value calculated from the input image and a hash value calculated from the output image, and comparing the two hash values. If the two hash values are different, it can be concluded that the images are different, and a pixel-by-pixel comparison can then be carried out to determine the nature of the difference.

Various artifacts may be detected which can cause the output to be deemed unacceptable. One type of artifacts is extraneous dark spots or "white spots" exceeding a certain two dimensional size (e.g., 4 pixels). This may be caused by a dirty drum or other drum problem, which causes extraneous toner missing toner.

Another type of artifacts is low toner, missing toner in a color printer, and/or uneven toner distribution. This may be detected by comparing intensity of the scanned output image with expected values. The output may be deemed unacceptable if the intensity is lower than a threshold value (e.g. 95% of the expected value) in some or all areas, or in the case of color printing, one of the colors in the output image is too weak or missing (e.g. less than 95% of the expected value) causing the color image to exhibit wrong colors. Such detection requires calibrating the imager for intensity including intensities of the colors. Calibration may be done by imaging output sheets with acceptable quality (as determined by a human operator) and storing the intensity (including color intensity) values. The calibration and image comparison would be relatively more complex for a color printer than a black and white printer.

Another type of artifacts that can be detected by image comparison is dirty paper or wrinkled paper. Such artifacts cause extraneous features, such as lines, spots, etc. to be present in the output images. It is noted that dirty paper may be distinguished from dirty drum by the fact that a dirty drum tends to cause dark spots or white spots at the same locations or at a same interval on multiple pages, while dirty paper does not. Making this kind of distinction requires the printer to store a history of the various artifacts detected on multiple pages.

Another type of artifacts is image skew. Image skew refers to the image on the paper (when the paper is aligned correctly) being rotated relative to the input image. Image skew can be detected using image comparison to detect a relative rotation between the input image and the output image.

Yet another type of artifacts is paper skew and paper misalignment, which refers to the output paper itself being positioned incorrectly. Paper skew and misalignment can be detected by detecting the leading edge of the paper using a line scanner, and alternatively or in addition, by using two or more optical spot sensors at an output port of the printer.

When an artifact is detected, the printing device may take one or more of the following actions: stopping the printing; displaying a diagnostic message to the operator; rejecting the output sheet containing the artifacts, re-printing the page and continuing printing; re-printing the current page with a corrective action; printing subsequent pages with a corrective action; etc. The action taken by the printing device depends on the type of artifact detected.

For example, if it is detected that the toner is slightly low, subsequent pages may be printed with a darker setting. If one of the color toners is low, then the input image may be adjusted by increasing the intensity values of that color. The amount of increase in intensity may be determined based on the detected intensity of the output image. As another example, if one of the colors is too weak, i.e. below a threshold intensity value, the page may be reprinted (on the same sheet) by printing only the weaker color. The amount of toner used in the re-printing may be determined based on the detected color intensities of the output image.

Other examples of the relationship between types of artifacts and responsive actions include: Toner too low, missing one color toner, dirty drum, paper skew or paper misalignment: stop printing and display a diagnostic message; dirty paper or wrinkled paper: reject the sheet, re-print the page on a new sheet and continue printing; etc.

According to another embodiment of the present invention, another imager (referred to as the input imager) is disposed at the input side of the printing device between the input paper tray and the image forming section (i.e. the drum). The input imager may be a line scanner, a camera, etc. The input imager captures an image of the paper before it is printed on (referred to as a blank image), and can be analyzed to detect certain artifacts including wrinkled paper, dirty paper, paper skew or misalignment, etc.

For example, the input paper may be deemed wrinkled if the blank image includes line features. Wrinkled paper may be rejected, i.e., routed to a reject paper tray that is different from the output tray, and continue to print on the next sheet of paper. Alternatively, the printing device may stop printing and display a diagnostic message. The input paper may be deemed dirty if the blank image contains dark spots exceeding a certain two dimensional size (e.g., 4 pixels) and darkness. When dirty paper is detected, the system may reject the paper and continue to print on the next sheet of paper, or stop printing and display a diagnostic message. Alternatively, the system may first determine, using the input image, whether the detected dirty spots can be covered by a bitmap image to be printed on the paper. If they cannot be covered, the printing device will reject the paper.

The input imager can also be used to detect skew (rotation) of the paper before it is printed on. A line scanner and/or multiple optical spot sensors may be used to detect the leading edge of the paper. Similarly, the input imager and/or additional sensors may be used to detect misalignment (shift) of the input paper. When minor skew and/or misalignment of the paper are detected, the skew angle and the shift amount may be calculated, and the printing device may then rotate and/or shift the image to be printed in order to compensate for the input paper skew and/or misalignment. As a result, the printed image is not skewed or misaligned with respect to the paper.

Further, the blank image captured by the input imager and the output image captured by the output imager may be analyzed together to determine certain types of artifacts. For example, for paper skew, both the blank image and the output image may be analyzed to confirm the detection result (e.g., the detection result is confirmed if the two images show similar amount of skew).

In the above descriptions, the output and input imagers capture images of the front side of the paper, i.e. the side currently being printed on. Additional imagers may be provided at the input and/or output end to capture images of the backside of the paper. This allows the detection of artifacts on the back of the paper even for single sided printing.

FIG. 1 is a block diagram schematically illustrating the structural components of a printer. The printer 200 includes a control section 201, an image processing section 202, a print engine 203, and an input/output (I/O) section 204. The control section 201 includes a central processing unit (CPU), a random access memory (RAM), and a read only memory (ROM). The CPU reads out various software/firmware programs stored in the ROM into the RAM to control the internal sections 202 through 204 of the printer 200. The CPU (and the RAM) also acts as a RIP (raster image processor). The PDL data sent from the PC 100 is temporally stored in the RAM, and is rasterized by the CPU acting as the RIP. The image processing section 202 carries out various image processing on rasterized image data under the control of the CPU 201, and sends the processed image data to the print engine 203. The print engine 203, which for instance employs the electrophotographic process, forms an image on a recording sheet based on the image data sent from the image processing section 202. The print engine 203 also includes mechanical components for routing papers. The I/O section accepts print data in the form of PDL from PC 100.

If the printing device is a copier or all-in-one machine, then it will further include a scanning section (not shown in FIG. 1) for generating a scanned image of a hardcopy original.

Figure 2:
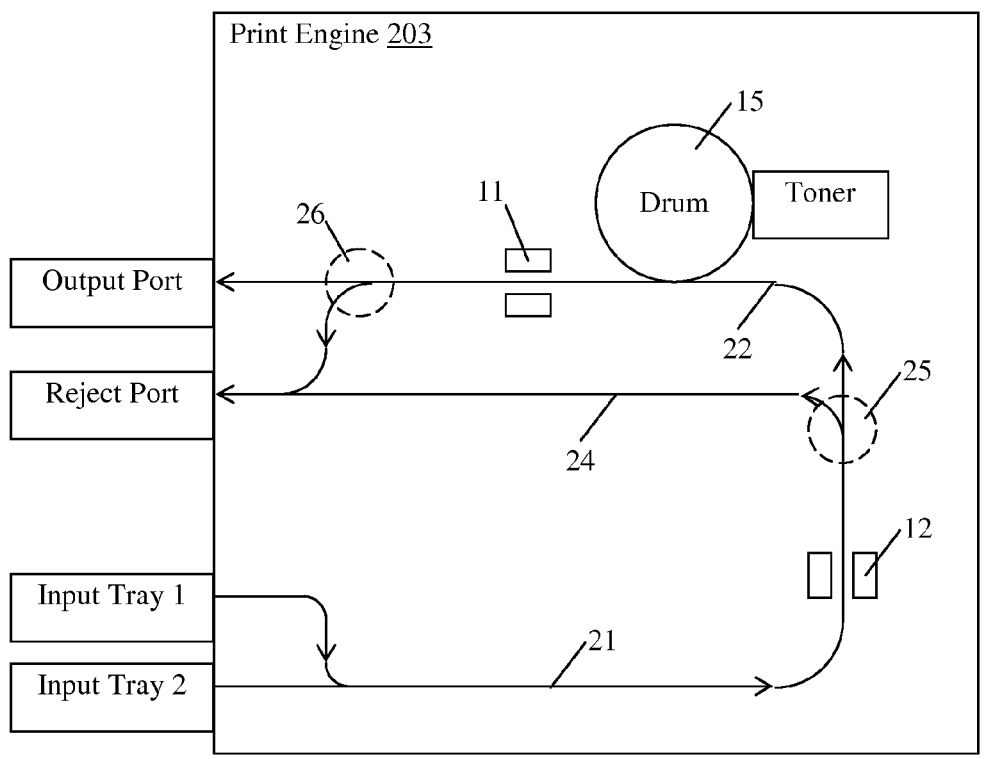
FIG. 2 schematically illustrates a print engine incorporating an input imager and an output imager according to embodiments of the present invention.

FIG. 2 schematically illustrates a print engine 203 according to embodiments of the present invention. The print engine 203 includes an image forming section (drum) 15 for forming an image in a sheet of paper. The paper transport paths within the print engine 203 are schematically illustrated but some detailed mechanical structures are omitted. The main paper path starts from the input paper tray(s), passes the drum 15, and ends at the output port. An output imager 11 is disposed on the main paper path between the drum 15 and the output port; an input imager 12 is disposed on the main paper path between the input tray and the drum. The output imager 11 captures an image of the paper after it is printed on (output image), and the input image 12 captures an image of the paper before it is printed on (blank image). The image data generated by the imagers 11 and 12 are transmitted to the control section 201 of the printer to be processed.

The sheets of recording medium (e.g. paper) are moved along the paper paths by a paper transport mechanism of the print engine 203, which includes various rollers (not shown) and paper routing mechanisms. Any suitable mechanical structures can be used for the paper transport mechanism. The paper transport mechanism is controlled by the control section 201 of the printer. The control section 201 analyzes the data received from the imagers 11 and 12, and generates various signals to control the actions of the paper transport mechanism to stop the paper movement, diverts the paper to different paths, etc.

The input paper first passes through a paper path segment 21 which includes the input imager 12. Downstream from the input imager 12, a first paper routing mechanism 25 routes the paper either further down the main paper path (segment 22) or to a reject port via paper path segment 24. The action of the first paper routing mechanism 25 is controlled by the control section 201 based on the blank image data generated by the input imager 12.

If the paper continues on the main paper path segment 22, the paper passes through the drum 15 and an image is printed on the paper. Downstream from the drum 15, a second paper routing mechanism 26 routes the printed paper either to the output port or to the reject port. In addition (optional; not shown in FIG. 2), the second paper routing mechanism 26 may route the printed paper back to the paper path segment 21 or 22 so that the paper can be reprinted for another pass. The action of the second paper routing mechanism 26 is controlled by the control section 201 based on the output image data generated by the output imager 11.

The paper paths in some printers are more complicated than that shown in FIG. 2. For example, some printers that have double-sided printing capabilities has a return paper path that routes the paper, after being printed on the first side, back to the image forming section for printing on the second side. For such a printer, paper that has been printed on the first side may be routed back to the main paper path at any point before the drum 15. This return paper path may be modified to route the paper that has been printed on once back to the paper path segments 21 or 22 for re-printing on the same side.

In FIG. 2, the output port is the paper output structure of the printer and can be any suitable structure such as a collator, stacker, etc. The reject port may be a dedicated tray for rejected paper, or it may be any one of the existing subtrays of the paper output structure so long as it is not the output structure used for outputting the correctly printed paper for the current print job. For example, when the printer has two or more output trays and the current print job selects some of them for outputting the printed paper, then one of the non-selected output trays can be used as the reject port for this print job. In other words, the reject port need not be a dedicated port or the same port for all print jobs.

Figure 3:
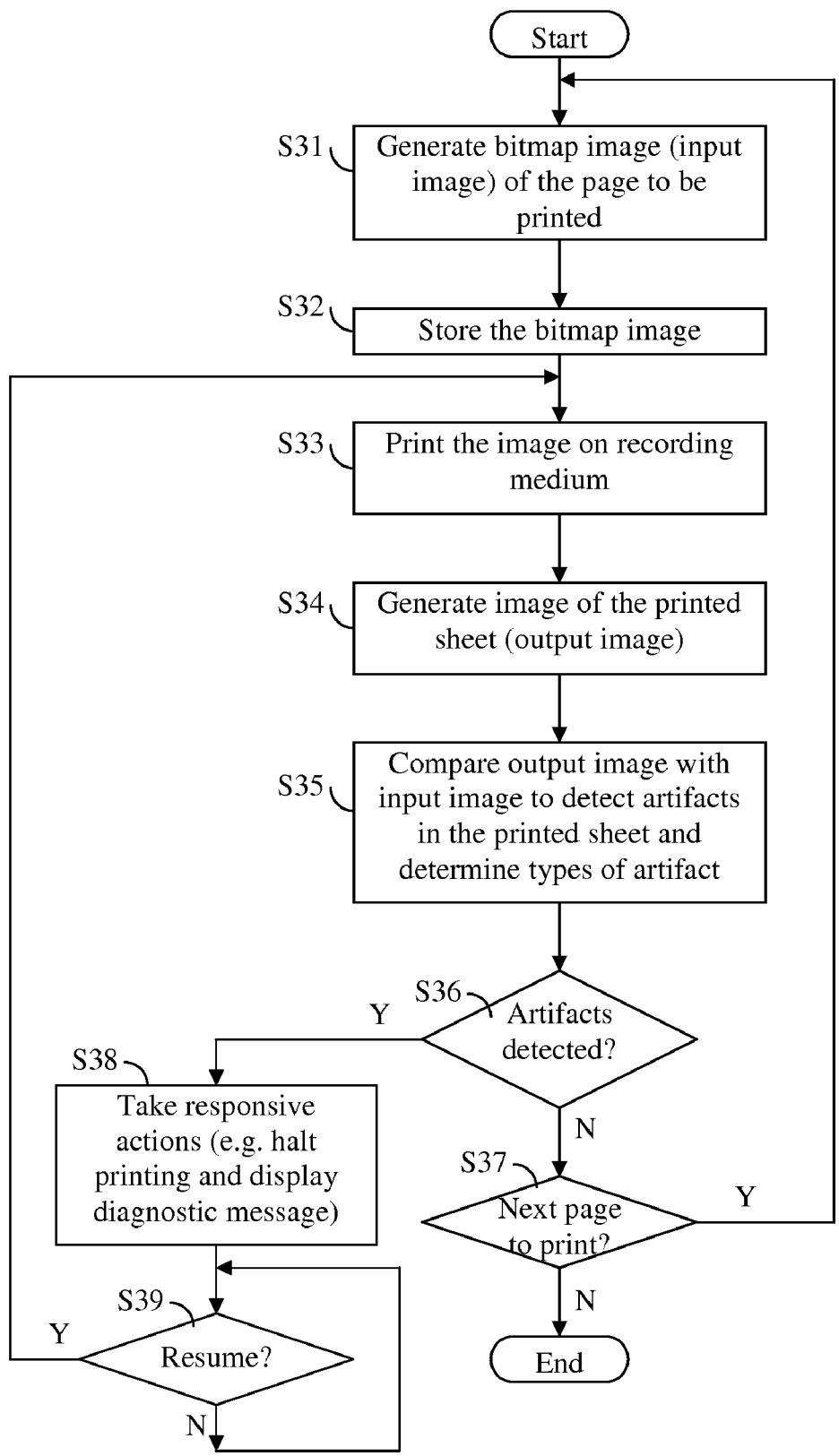
FIG. 3 is a flow diagram illustrating a printing process according to an embodiment of the present invention.

FIG. 3 illustrates a printing process which utilizes the output imager to detect artifacts in printed sheets. The process is executed by a printing device such as the printing device 200 shown in FIGS. 1 and 2. As shown in FIG. 3, for each page to be printed, the printing device first generates a bitmap (raster) image of the page to be printed (i.e. the input image) (step S31). In the case of a printer, the bitmap image is generated from print data, such as PDL (page description language) data or PDF data, received by the printer 200 from an external device such as the computer 100. In the case of a copier, the bitmap image is generated by scanning an original hardcopy document. The bitmap image is stored in a memory or storage device of the printing device 200 (step S32).

The image forming section 15 then forms the image on a sheet of recording medium such as paper (step S33). After the image is printed on the paper, the output imager 11 generates an image (the output image) of the printed sheet of paper (step S34). The output image data is analyzed by the control section 201 of the printing device, which compares the output image with the stored input image to detect any artifacts in the printed sheets and to determine the types of the artifacts (step S35). The various types of artifacts that can be detected based on the output image have been described earlier.

If no artifacts are detected for this page ("N" in step S36), the process continues to print the next page ("Y" in step S37) unless the current page is the last page to be printed ("N" in step S37).

If an artifact is detected for this page ("Y" in step S36), the printing device takes responsive actions based on the type of artifacts (step S38). One type of responsive action, shown in FIG. 3 as an example, is to halt the printing and display a diagnostic message to the operator. For example, if the image intensity is lower than a threshold value, indicating low toner, the printing device will halt the printing and route the sheet to the reject port. Further, the displayed diagnostic messages are based on the type of artifacts determined in step S35 and the type of responsive action taken. For example, in the above example, the diagnostic message preferably states that printing has been stopped because the toner is too low, with an instruction to the operator to change the toner.

After halting the printing, the printing device waits for the operator to perform appropriate actions with respect to the printing device (e.g. install a new toner cartridge in the above example). After resolving the problem with the printing device, the operator issues a resume command to the printing device using, for example, a control panel on the printing device. After receiving the resume command ("Y" in step S39), the printing device resumes printing, with corrective actions if appropriate. The corrective actions depend on the type of artifacts detected in step S35. For example, if printing was stopped due to low toner in the above example, the printing device will re-print the current page.

When the responsive actions in step S38 do not involve halting the printing, then step S39 is not necessary and the process will continue to step S37. For example, if the artifact detected in step S35 is dirty paper, the responsive actions in step S38 is to reject the sheet and re-print the current page on the next sheet of paper; the process will continue to print the next page.

Figure 4:
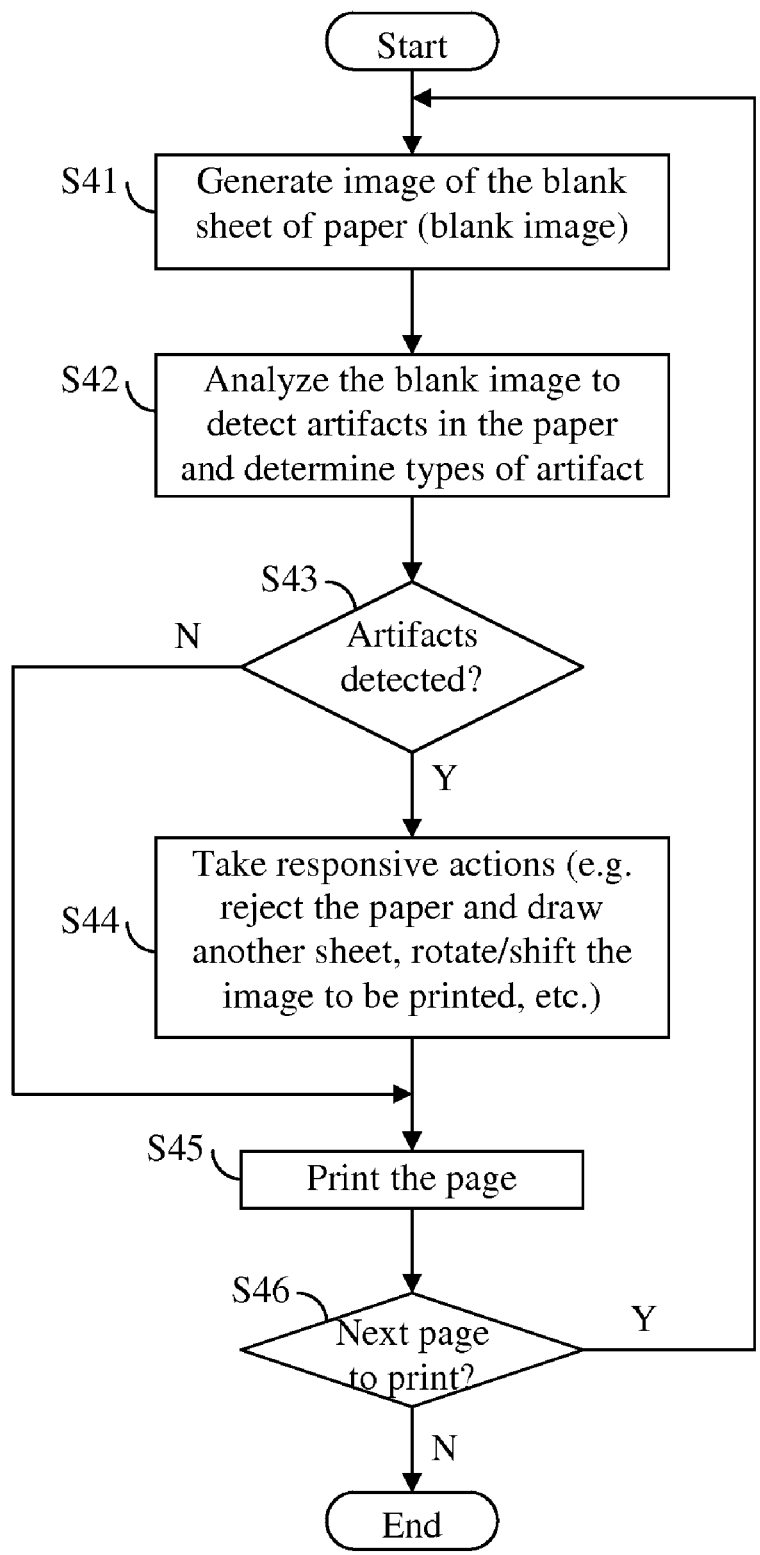
FIG. 4 illustrates a flow diagram illustrating a printing process according to another embodiment of the present invention.

FIG. 4 illustrates a printing process which utilizes the input imager to detect artifacts in the blank paper. The process is executed by a printing device such as the printing device 200 shown in FIGS. 1 and 2. As shown in FIG. 4, for each page to be printed, the input imager 12 generates an image (the blank image) of the blank recording medium (e.g. paper) (step S41). The blank image data is analyzed by the control section 201 of the printing device, which detects any artifacts in the blank paper and determines the types of the artifacts (step S42). The various types of artifacts that can be detected based on the blank image have been described earlier.

If no artifacts are detected for this sheet of paper ("N" in step S43), the page is printed (step S45), and the process continues to print the next page ("Y" in step S46) unless the current page is the last page to be printed ("N" in step S46).

If an artifact is detected for this sheet of paper ("Y" in step S43), the printing device takes responsive actions based on the type of artifacts (step S44). For example, the corrective action may be to reject the sheet of paper and draw a new sheet if dirty paper or wrinkled paper is detected, or to adjust (rotate and/or shift) the image to be printed if slight paper skew and/or misalignment is detected, etc. In the examples given in FIG. 4, the printing is not halted, and the page is printed (step S45) after taking the responsive actions. If, on the other hand, the responsive actions in step S44 include halting the printing, then the process will wait for a resume command from the operator before resuming printing.

The processes shown in FIGS. 3 and 4 may be combined and implemented in the same printing process. In such a printing process, steps S41 through S44 of FIG. 4 will be performed before steps S33 through S39 in FIG. 3. At least step S44 will be performed after steps S31 and S32 because step S44 may include re-calculating the image to be printed.

According to embodiments of the present invention, the responsive actions to be taken in response to each type of artifacts are pre-defined in the printing device. The correlation between the responsive actions and the types of artifacts may be implemented as a part of the control algorithm for the printing device and not subject to change by the operator or system administrator. Alternatively, the operator or system administrator may be allowed to set various criteria for the artifact detection algorithm and to define the responsive actions for each type of artifact. An appropriate user interface may be provided for the operator or system administrator to set these conditions.

Embodiments of the present invention provide the advantages of reduced waste and improved printing quality.

It will be apparent to those skilled in the art that various modification and variations can be made in the printing device and related method of the present invention without departing from the spirit or scope of the invention. Thus, it is intended that the present invention cover modifications and variations that come within the scope of the appended claims and their equivalents.

What is claimed is:

1. A printing device comprising:
  an image forming section for printing on a recording medium based on an input image;
  a transport mechanism for transporting the recording medium along a transport path from an input port to an output port past the image forming section;
  an output imager disposed on the transport path downstream from the image forming section for capturing an output image of the recording medium after it is printed on;
  a control section coupled to the image forming section, the transport mechanism and the output imager;

wherein the control section receives the output image from the output imager, compares the output image with the input image to detect any artifacts in the output image and to determine types of the detected artifacts, and performs responsive actions based on the types of the detected artifacts; and wherein the responsive actions include controlling the transport mechanism to route the recording medium for re-printing on a same side of the recording medium.

2. The printing device of claim 1, wherein the types of artifacts include: extraneous dark spots or white spots caused by dirty or defective drum, low image intensity caused by low toner, low intensity of one color caused by low color toner, extraneous features caused by dirty recording medium or wrinkled recording medium, image skew, skew of the recording medium, and misalignment of the recording medium.

3. The printing device of claim 1, wherein the responsive actions further include: displaying a diagnostic message, controlling the transport mechanism to stopping printing, controlling the transport mechanism to route the printed recording medium to an alternative output port, and printing subsequent pages with a corrective action.

4. The printing device of claim 1, wherein the output imager is a line scanner.

5. The printing device of claim 1, wherein the control section compares the output image with the input image using a pixel-by-pixel comparison.

6. The printing device of claim 1, further comprising an input imager disposed in the transport path upstream from the image forming section for capturing a blank image of the recording medium before it is printed on, the input imager being coupled to the control section, wherein the control section receives the blank image from the input imager, analyzes the blank image to detect any artifacts of the recording medium and to determine types of the detected artifacts, and performs second responsive actions based on the types of the detected artifacts of the recording medium.

7. The printing device of claim 6, wherein the types of artifacts of the recording medium include: wrinkled recording medium, dirty recording medium, skew of the recording medium, and misalignment of the recording medium.

8. The printing device of claim 6, wherein the second responsive actions include: displaying a diagnostic message, controlling the transport mechanism to stopping printing, controlling the transport mechanism to route the unprinted recording medium to an alternative output port, and rotating or shifting the image to be printed based on an amount of skew or misalignment of the recording medium.

9. A printing device comprising:
an image forming section for printing on a recording medium;
a transport mechanism for transporting the recording medium along a transport path from an input port to an output port past the image forming section;
an input imager disposed in the transport path upstream from the image forming section for capturing a blank image of the recording medium before it is printed on;
a control section coupled to the image forming section, the transport mechanism and the input imager;
wherein the control section receives the blank image from the input imager, analyzes the blank image to detect any artifacts of the recording medium and to determine types of the detected artifacts, and performs responsive actions based on the types of the detected artifacts of the recording medium; and wherein when the detected artifacts is a dirty spot on the recording medium, it is further determined whether the dirty spot may be covered by a bitmap image to be printed on the recording medium, and if the dirty spot cannot be covered then rejects the recording medium.

10. The printing device of claim 9, wherein the types of artifacts of the recording medium include: wrinkled recording medium, dirty recording medium, skew of the recording medium, and misalignment of the recording medium.

11. The printing device of claim 9, wherein the responsive actions include: displaying a diagnostic message, controlling the transport mechanism to stopping printing, controlling the transport mechanism to route the unprinted recording medium to an alternative output port, and rotating or shifting the image to be printed based on an amount of skew or misalignment of the recording medium.

12. A printing method implemented in a printing device, the printing device comprising an image forming section, a transport mechanism and an output imager, the method comprising:
storing an input image to be printed;
printing the input image on a recording medium using the image forming section;
capturing an output image of the recording medium after it is printed on using the output imager;
comparing the output image with the input image to detect any artifacts in the output image and to determine types of the detected artifacts;
if an artifact is detected, performing responsive actions based on the types of the detected artifacts; and
wherein the responsive actions include controlling the transport mechanism to route the recording medium for re-printing on a same side of the recording medium.

13. The method of claim 12, wherein the types of artifacts include: extraneous dark spots or white spots caused by dirty or defective drum, low image intensity caused by low toner, low intensity of one color caused by low color toner, extraneous features caused by dirty recording medium or wrinkled recording medium, image skew, skew of the recording medium, and misalignment of the recording medium.

14. The method of claim 12, wherein the responsive actions further include: displaying a diagnostic message, controlling the transport mechanism to stopping printing, controlling the transport mechanism to route the printed recording medium to an alternative output port, and printing subsequent pages with a corrective action.

15. The method of claim 12, wherein the step of comparing the output image with the input image includes a pixel-by-pixel comparison.

16. The method of claim 12, wherein the printing device further comprises an input imager, the method further comprising:
capturing a blank image of the recording medium before it is printed on using the input imager;
analyzing the blank image to detect any artifacts of the recording medium and to determine types of the detected artifacts; and
if an artifact of the recording medium is detected, performing second responsive actions based on the types of the detected artifacts of the recording medium.

17. The method of claim 16, wherein the types of artifacts of the recording medium include: wrinkled recording medium, dirty recording medium, skew of the recording medium, and misalignment of the recording medium.

18. The method of claim 16, wherein the second responsive actions include: displaying a diagnostic message, controlling the transport mechanism to stopping printing, controlling the transport mechanism to route the unprinted recording medium to an alternative output port, and rotating or shifting the image to be printed based on an amount of skew or misalignment of the recording medium.

19. A printing method implemented in a printing device, the printing device comprising an image forming section, a transport mechanism and an input imager, the method comprising:
   printing an image on a recording medium using the image forming section;
   capturing a blank image of the recording medium before it is printed on using the input imager;
   analyzing the blank image to detect any artifacts of the recording medium and to determine types of the detected artifacts;
   if an artifact of the recording medium is detected, performing responsive actions based on the types of the detected artifacts of the recording medium; and
   wherein when the detected artifacts is a dirty spot on the recording medium, it is further determined whether the dirty spot may be covered by a bitmap image to be printed on the recording medium, and if the dirty spot cannot be covered then rejects the recording medium.

20. The method of claim 19, wherein the types of artifacts of the recording medium include: wrinkled recording medium, dirty recording medium, skew of the recording medium, and misalignment of the recording medium.

21. The method of claim 19, wherein the responsive actions include: displaying a diagnostic message, controlling the transport mechanism to stopping printing, controlling the transport mechanism to route the unprinted recording medium to an alternative output port, and rotating or shifting the image to be printed based on an amount of skew or misalignment of the recording medium.

* * * * *